United States Patent [19]

Cymbalisty et al.

[11] Patent Number: 4,545,892
[45] Date of Patent: Oct. 8, 1985

[54] TREATMENT OF PRIMARY TAILINGS AND MIDDLINGS FROM THE HOT WATER EXTRACTION PROCESS FOR RECOVERING BITUMEN FROM TAR SAND

[75] Inventors: Lubomyr M. O. Cymbalisty; George J. Cymerman, both of Edmonton, Canada

[73] Assignees: Alberta Energy Company Ltd., Calgary; Canadian Occidental Petroleum Ltd., Calgary; Esso Resources Canada Limited, Calgary; Gulf Canada Limited, Toronto; Her Majesty the Queen in right of Canada, as represented by the Minister of Energy and Natural Resources, Edmonton; HBOG-Oil Sands Limited, Calgary; Pan Canadian Petroleum Limited, Calgary; Petro-Canada Inc., Calgary, all of Canada

[21] Appl. No.: 723,301

[22] Filed: Apr. 15, 1985

[51] Int. Cl.$^4$ ............................................. C10G 1/00
[52] U.S. Cl. ............................... 208/11 LE; 422/261; 422/269
[58] Field of Search ............. 208/11 LE, 8 LE; 422/261, 269

[56] References Cited

U.S. PATENT DOCUMENTS

| | | | |
|---|---|---|---|
| 1,497,607 | 6/1924 | Streppel | 208/11 LE |
| 2,790,750 | 4/1957 | Eyre | 208/11 LE |
| 2,871,180 | 1/1959 | Lowman, Jr. et al. | 208/11 LE |
| 2,903,407 | 9/1959 | Fischer et al. | 208/11 LE |
| 2,965,557 | 12/1960 | Price | 208/11 LE |
| 3,159,562 | 12/1964 | Bichard et al. | 208/11 LE |
| 3,271,293 | 9/1966 | Clark | 208/11 LE |
| 3,738,929 | 6/1973 | Terry et al. | 208/11 LE |
| 3,847,789 | 11/1974 | Cymbalisty | 208/11 LE |
| 3,893,907 | 7/1975 | Canevari | 208/11 LE |
| 3,954,415 | 5/1976 | Davitt | 208/11 LE |
| 3,986,592 | 10/1976 | Baillie et al. | 208/11 LE |
| 4,096,057 | 6/1978 | Porritt et al. | 208/11 LE |
| 4,105,537 | 8/1978 | McQuitty | 208/11 LE |
| 4,107,029 | 8/1978 | Lorenz | 208/11 LE |
| 4,313,912 | 2/1982 | Barger | 208/11 LE |
| 4,392,941 | 7/1983 | Roth et al. | 208/11 LE |

FOREIGN PATENT DOCUMENTS

| | | | |
|---|---|---|---|
| 657876 | 2/1963 | Canada | 208/11 LE |
| 1033675 | 10/1974 | Canada | 208/11 LE |

Primary Examiner—D. E. Gantz
Assistant Examiner—A. Pal
Attorney, Agent, or Firm—Ernest Peter Johnson

[57] ABSTRACT

The primary tailings and middlings are combined and fed to a vessel having the general form of a deep cone thickener. The feed is deflected outwardly and generally horizontally by a baffle, as it is delivered to the vessel. Simultaneously, the outwardly radiating layer of newly added feed is contacted from below by an upwelling stream of aerated middlings, which stream moves in parallel with the aforesaid layer. Bitumen froth is formed and recovered. The upwelling stream is provided by circulating middlings through eductor/aerator assemblies and a plenum chamber mounted centrally in the body of middlings in the vessel. A generally circular circulation of middlings is generated. In this manner, the newly added bitumen is quickly and efficiently recovered. Recirculation of middlings to the aeration zone yields an additional recovery of bitumen. Use of the deep cone ensures that the tailings from the vessel are relatively low in water and bitumen content.

23 Claims, 6 Drawing Figures

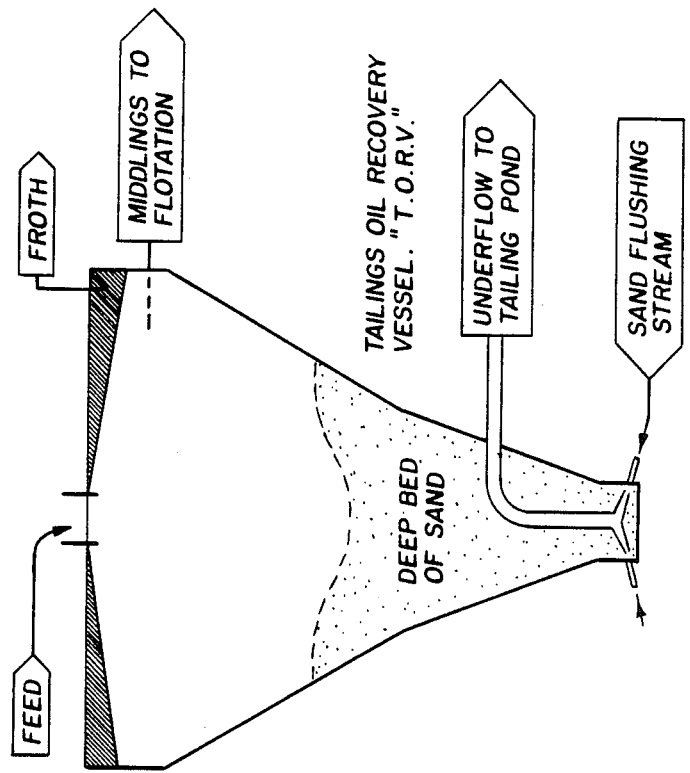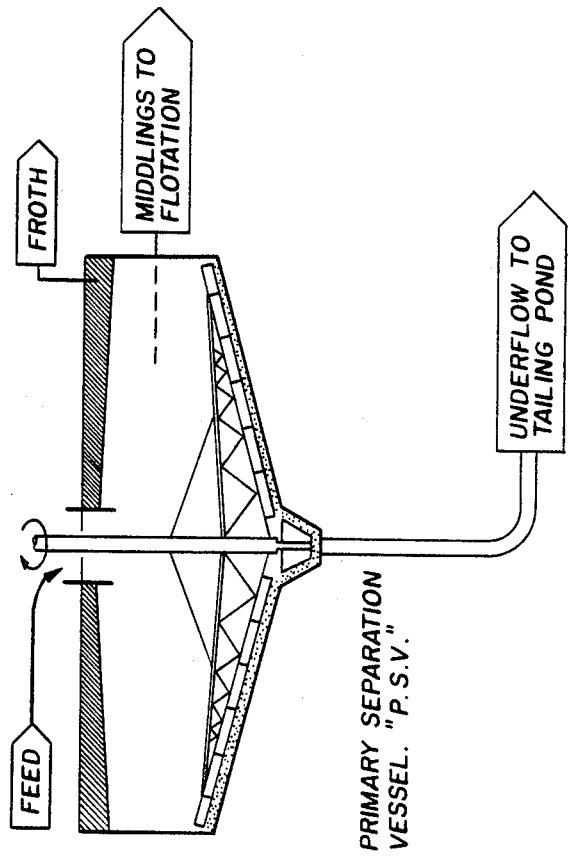

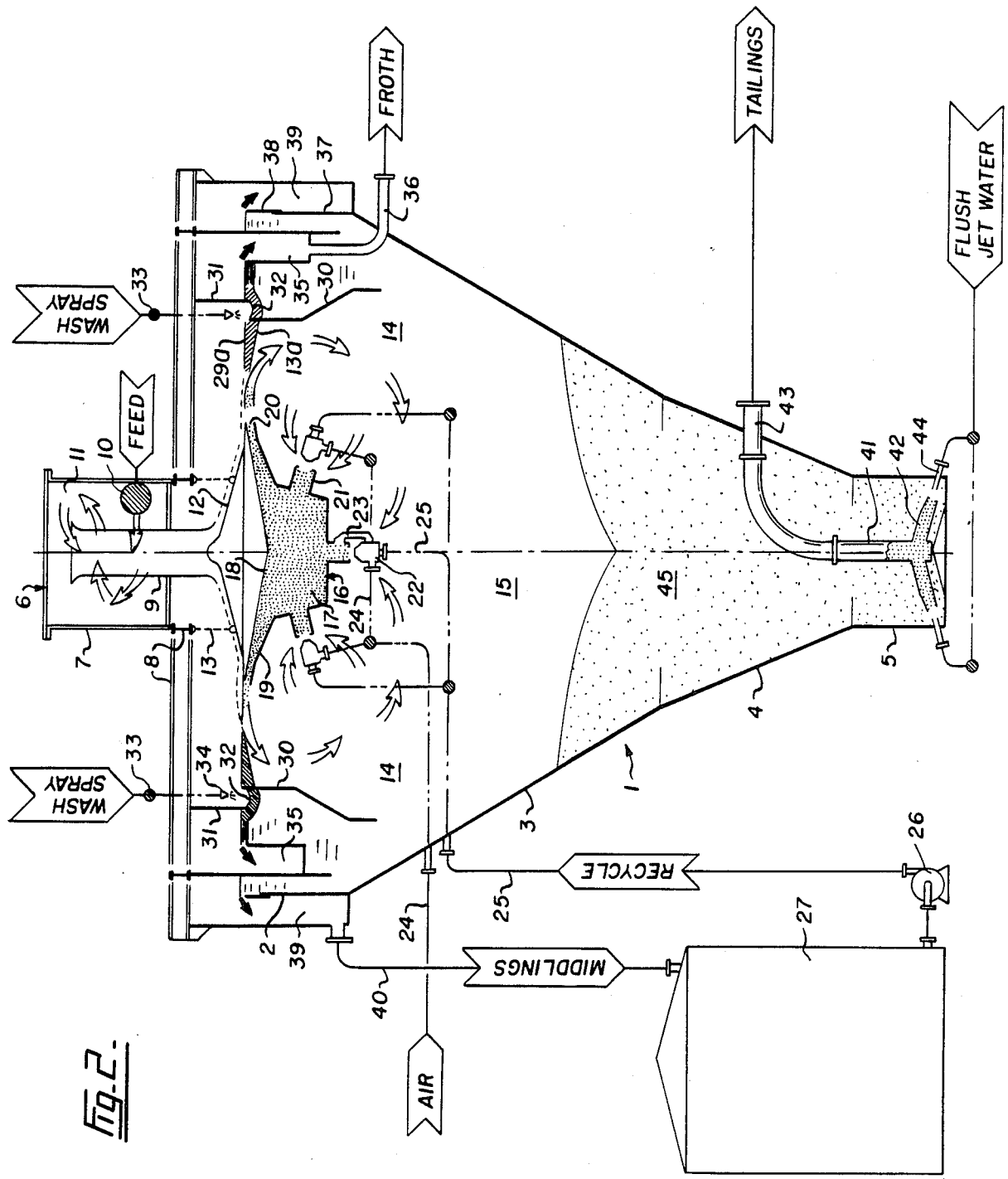

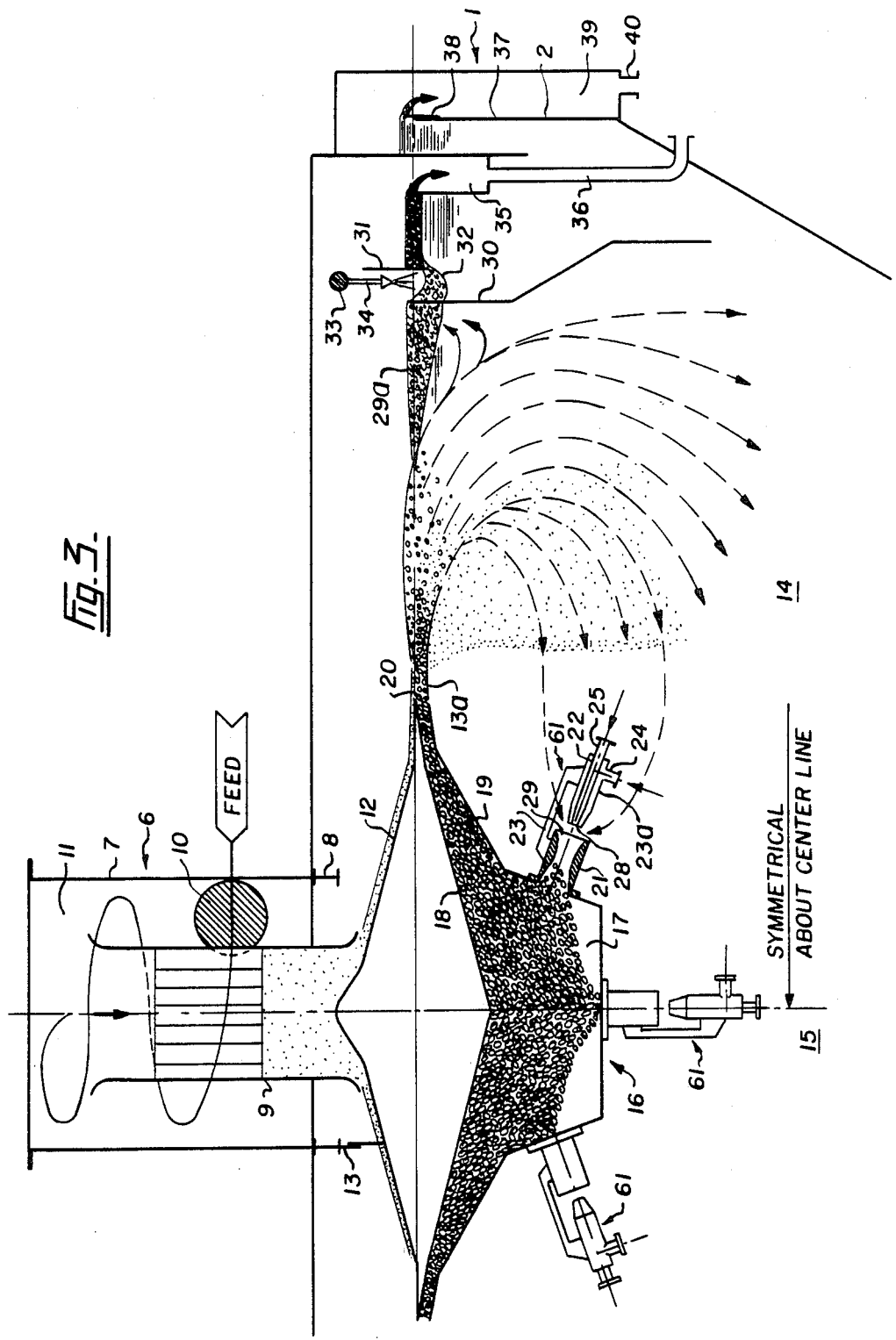

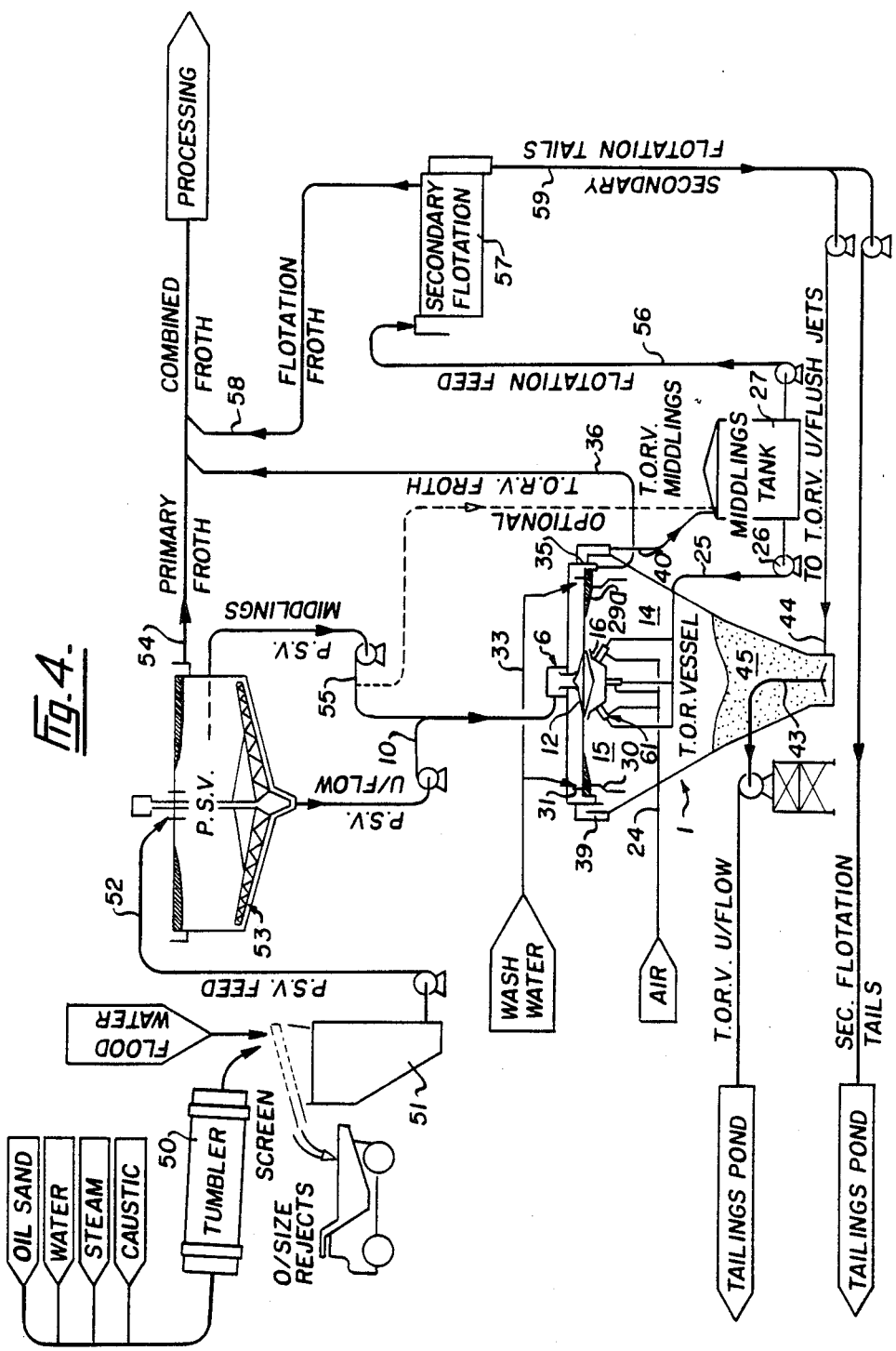

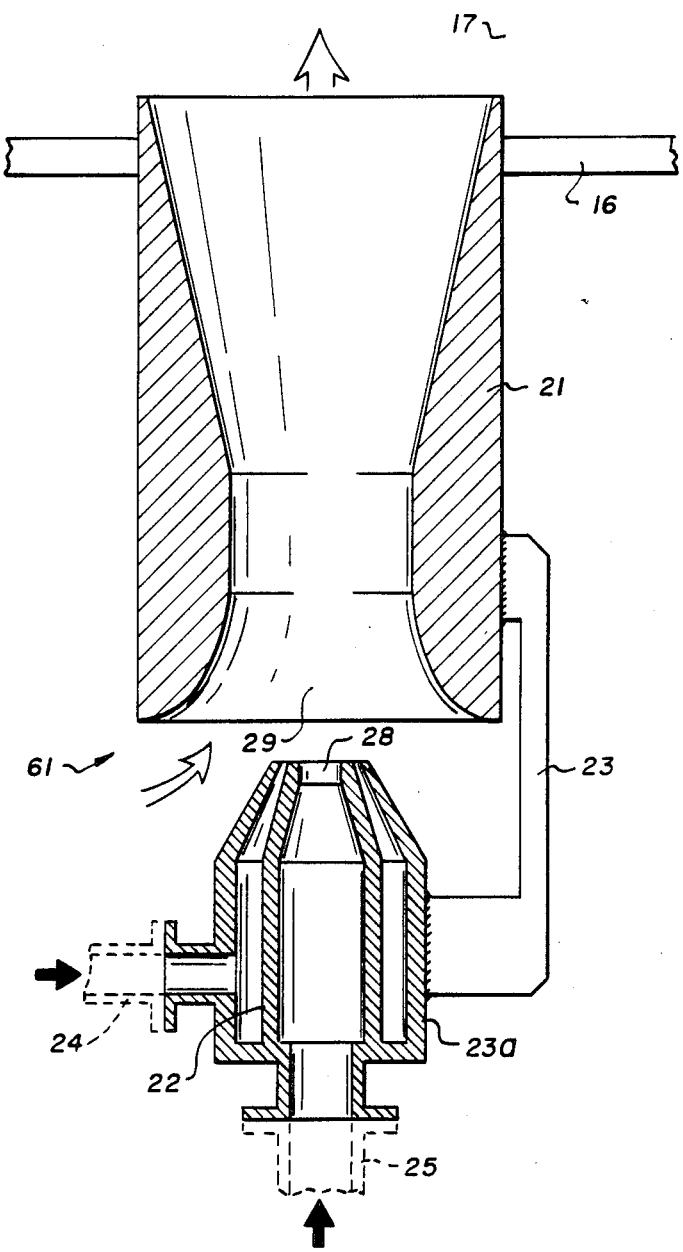

TREATMENT OF PRIMARY TAILINGS AND MIDDLINGS FROM THE HOT WATER EXTRACTION PROCESS FOR RECOVERING BITUMEN FROM TAR SAND

FIELD OF THE INVENTION

This invention relates to a method and apparatus for recovering bitumen from a feed stream comprising solids, water and bitumen, preferaby one or both of the tailings and middlings streams from the primary separation vessel used in the extraction of bitumen from tar sand by the hot water process.

BACKGROUND OF THE INVENTION

Tar sand is currently being exploited for the recovery of bitumen therefrom by two large commercial plants in the Athabasca region of Alberta. In general, the tar sand is mined, the bitumen is extracted from it by means of the hot water process, and the bitumen is upgraded in a refinery-like operation to produce synthetic crude.

The mined tar sand comprises coarse sand particles, individually sheathed in a thin film of connate water, with bitumen trapped in the interstices and clay-size mineral particles (termed 'fines') distributed in the sheaths.

The tar sand is not constant in composition. There is a significant variation in its nature and processibility. In general, the bitumen content diminishes and the fines content increases as the grade of the tar sand deteriorates. A "rich" tar sand typically might comprise:

| | |
|---|---|
| Total solids | 85.0% |
| bitumen | >12% |
| fines | 5% of total solids |
| A "poor" tar sand typically might comprise: | |
| Total solids | >85% |
| bitumen | 8.0% |
| fines | up to 25% of total solids |

Typically, one might expect to recover greater than 90% of the contained bitumen from a "rich" tar sand and only about 60% from a "poor" tar sand, in the primary separation step of the hot water extraction process.

The variation in the nature and quality of the tar sand feed depends on factors such as location, depth in the deposit, and the like. As a general statement, it is true that the ever-varying quality of the tar sand feed generates significant operating and recovery problems for the extraction plant.

At this point, it is appropriate to describe the hot water process in a general sense. The details of the process are well documented in the literature.

In the first step of the process, the as-mined tar sand is fed into a horizontal, rotating drum. Hot water, having a temperature of about 180° F., is also fed into the drum and steam is sparged into the mixture, to maintain a slurry temperature of about 180° F. The rotating drum cascades the porridge-like mixture, with the result that air bubbles become entrained therein. After a residence time of perhaps 10 minutes, the slurry is discharged onto a screen, to separate oversize material.

This initial step is referred to as "conditioning". Pursuant to it, the bitumen is heated; the tar sand components are diluted with water and dispersed in a preliminary fashion; and air bubbles are entrained in the mixture.

The screened, conditioned slurry is then diluted wirh additional hot water and introduced into a thickener-like flotation vessel. This vessel is referred to as the primary separation vessel ("PSV"). It is shown schematically in FIG. 1a. As illustrated, it is an open-topped vessel, having a cylindrical upper end and a shallow cone lower end. The angularity of the cone end is in the order of 23°. The vessel has a launder at its upper end, so that froth formed at the surface of the vessel contents may overflow and be recovered. It further has an internal rake assembly in the cone, for moving sand collected and concentrated therein to a bottom outlet. The slurry feed is added to the vessel contents via a conduit and central well. An outlet is provided in the mid-section of the vessel, for the withdrawal of middlings.

In the PSV, the bulk of the sand settles into the conical end, where it is concentrated, with a concomitant expulsion of liquid phase. The resultant sand layer typically has a liquid content of 65% by weight. This product, termed "primary tailings", is withdrawn through the bottom outlet. Most of the bitumen particles entering the PSV with the feed slurry are attached to or become attached to air bubbles and rise to form a froth layer at the surface of the vessel contents. This froth is recovered via the launder, as aforesaid, and is referred to as "primary froth". The bulk of the water in the feed, together with some bitumen and solids, collects in the mid-section of the vessel and is referred to as PSV "middlings". A dragstream of middlings is continuously withdrawn at a controlled rate through outlets in the vessel side wall. The desired level of the froth-middlings interface is maintained by control of the rate of PSV middlings withdrawal. The level of the middlings-sand interface is controlled by varying the rate of tailings withdrawal.

As stated, the PSV middlings is largely water, but it includes some bitumen and solids. The bitumen was insufficiently buoyant to reach the froth layer in the PSV. The solids is mostly fines.

The middlings dragstream is processed in one or more induced air flotation cells. Each of these cells, termed "secondary recovery cells", is equipped with an up-throwing impellor positioned in its bottom end. Air is induced to flow downwardly through the hollow shaft of the impellor and is released at the impellor blade. So the cells incorporate turbulent agitation and copious aeration. As a result, some of the middlings bitumen forms a froth layer on the surface of the cell contents. This froth, called "secondary froth", is recovered. A bitumen-depleted, watery underflow, termed "secondary tailings" is withdrawn through an outlet in the base of the cell.

The secondary froth is settled in a tank, to remove some water and solids from it, and then is combined with the primary froth. This latter stream is subjected to downstream cleaning and upgrading, to yield a saleable product. The primary and secondary tailings are combined and impounded in waste ponds.

Now, two main objectives in managing the hot water process are to maximize the proportion of feed bitumen which reports as primary froth and to minimize the proportion lost with the two tailings streams. The losses with the tailings are substantial. In applicant's plant, which produces in the order of 130,000 barrels of synthetic crude per day, the combined tailings are produced at a typical rate of 7600 kg./sec. and the present bitumen losses with said tailings is in the order of 6 million barrels per year.

In managing the process, the withdrawal of middlings and tailings from the PSV is adjusted as required:

to try to maintain the froth-middlings interface at a generally constant elevation;

and to try to maintain the solids content of the withdrawn tailings as close to about 65% by weight as possible, by controlling the depth of the sand bed in the cone.

If the level of the froth-middlings interface rises, the PSV will overflow; if the level drops, then bitumen losses will rise. If too much liquid leaves with the tailings, then bitumen losses again rise, as the bitumen accompanies the water.

Another complicating factor affecting the performance of the PSV is the nature or grade of the tar sand being processed. If the feed is "rich" tar sand, then the fines content in the slurry is relatively low and thus the slurry viscosity is relatively low. The bitumen particles in rich tar sand are relatively large in size and are more likely to have become aerated. Thus they can relatively easily rise through the middlings and primary froth recovery is relatively high. And all this can be realized with relatively modest water addition. But if the feed is "poor" tar sand, then fines content is high and the viscosity of the middlings rises. In addition, the bitumen particles are smaller with this type of feed and they do not aerate well. As a result, they do not rise well and the primary froth yield diminishes. So the operator must make process adjustments, to try to minimize the undesirable effects taking place.

If the operator is varying water addition, then it follows that the middlings withdrawal rates have to be varied, to maintain the froth-middlings interface level constant and to maintain the primary tailings dense. Varying the feed rate to the secondary recovery circuit can lead to overloading of that circuit. As a result, bitumen losses with the secondary tailings increase, in conjunction with an increase in other operating difficulties.

With this background in mind, it will be appreciated that there is a need to improve the hot water process to achieve the following:

reduction in bitumen losses with the tailings; and relief of the need to widely vary primary middlings widhdrawal rates, by loosening the required density control on the primary tailings. This would smooth out fluctuations in the feed rate to the secondary circuit and permit of better management of that circuit.

In a general sense, this would involve treating the primary tailings. In considering how to obtain such as improvement, one is faced with certain problematical facts, namely:

that the potential feedstock, PSV tailings, has a very large proportion of solids and a small proportion of bitumen (see Table I following below);

that the volume of such a feedstock is very large and there is relatively little valuable product to be obtained from it, so the process used must be simple and inexpensive;

and that the bitumen in the tailings is bitumen which was insufficiently buoyant to be recoverable from the medium of the dilute middlings in the PSV.

TABLE I

| Composition of a Typical Primary Tailings | |
|---|---|
| Bitumen | 0.4 weight % |
| Water | 34.6 weight % |

TABLE I-continued

| Composition of a Typical Primary Tailings | |
|---|---|
| Solids | 65.0 weight % |

SUMMARY OF THE INVENTION

In accordance with the invention, a feed stream, comprising water, sand, bitumen and fines, preferably consisting of combined PSV tailings and PSV middlings, is fed to a tailings oil recovery vessel (TORV). This vessel preferably has the form of a deep cone thickener-that is, it has a cylindrical upper section and a sharp angled, conical lower section. No rake assembly is provided in the conical section.

The fresh feed is delivered to the surface of the middlings in the TORV and is spread or deflected outwardly, preferably with a transversely extending baffle or the like, so that said newly added feed tends to assume a generally horizontal, outwardly radiating form as it joins the feed already in the TORV. At the same time, the newly added feed is contacted from below by an upwelling aerated middlings current. This current is generated in the middlings already in the TORV. Preferably, the current is generated by withdrawing middlings from the TORV and pumping them through a conduit loop to discharge upwardly through a nozzle into an eductor positioned centrally in the TORV middlings. The middlings so pumped induce additional middlings to circulate upwardly through the eductor and an upwelling, central current is thus generated. This current is aerated, for example by a sparger associated with the nozzle, with a multitude of small air bubbles.

By means of this preferred combination of mechanical and hydraulic deflection, the bitumen particles in the feed are to a considerable extent initially kept from plunging into the depths of the TORV middlings and are mixed with copious quantities of air bubbles. It is found that much of the bitumen in the newly added feed forms froth as a result and may be recovered. By using TORV middlings to provide the upwelling current, many of the bitumen particles which have settled into the middlings zone are recycled to the aerated zone and may be recovered.

The water in the feed, and some associated bitumen and solids, accumulates as middlings in the mid-section of the TORV. Such middlings are withdrawn from the TORV mid-section and are preferably fed to the secondary recovery circuit.

The sand in the feed is distributed across the cross-section of the TORV contents when first delivered. Most of its settles through the middlings and enters the deep cone section. Here the liquid associated with the sand is largely squeezed or displaced out, to rejoin the middlings. There is produced at the base of the conical section a high solids (in the order of >65% by wt. solids) sand bed which is very low in bitumen content. In most circumstances, it is necessary to dilute this stream with some water brought into the cone from an external source, to fluidize the sand-laden tailings so that it will flow out of the TORV through a bottom outlet.

From the foregoing, it will be noted that the invention involves two features in combination, namely:

maximizing quick and extensive conversion of bitumen to froth, so that there is a low concentration of bitumen in any water lost with the TORV underflow;

and minimizing the loss of liquid with the TORV underflow tailings, by creating a dense sand bed in the deep cone section, to squeeze out a relatively high proportion of the liquid associated with the sand.

The invention is characterized by a number of advantages, including:

1. All of the feed passes through the aeration zone and a significant recovery of bitumen is realized;

2. Aeration of the bitumen occurs at the surface of the TORV contents, thus minimizing the length of the travel that an aerated bubble of bitumen must traverse (in contradistinction to the situation in a secondary flotation cell, wherein the air is introduced at the base of the cell);

3. A TORV tailings underflow is obtained which is quite clean, with the result that the environmental impact of the pond into which the stream is discharged is improved;

4. The fluctuations in feed rate to the secondary recovery circuit are to a significant extent smoothed out;

5. The need for close control of the bitumen content in the PSV underflow is diminished, as this bitumen can be recaptured in the TORV-this simplifies operating problems heretofore associated with the PSV;

6. The process mechanisms of aeration, flotation, mixing, settling, separation, and removal are all practised together in one vessel without internal moving parts;

7. The combination of the deep cone and fluidization permits of gravity of suction transport of the sand to the bottom outlet, without need for a rake system and the problems attendant therewith; and 8. The sensitivity of the hot water extraction process plant to variations in tar sand feed grade is diminished.

Broadly stated, the invention is a method for continuously recovering bitumen from a feed stream comprising water, sand, bitumen and fines in a vessel having a conical lower end and which defines a processing chamber, comprising: delivering said feed stream to be processed at the surface of the body of middlings already in the chamber; substantially simultaneously contacting the newly added feed with a current of outwardly and generally horizontally moving aerated middlings; whereby said newly added feed moves generally radially of the chamber in contact with the aerated middlings current, part of the bitumen contained in said newly added feed forms a froth layer at the surface of the body, bitumen-depleted feed forms a body of middlings in the chamber below the froth layer, and sand particles contained in said newly added feed settle downwardly; concentrating the settling sand particles in the conical lower end of the vessel into the form of a dense solids bed, thereby separating the greatest part of the liquid phase from the solids phase; recovering the greatest part of the froth from the vessel; withdrawing an underflow tailings stream from the base of the vessel; and withdrawing a middlings stream from the vessel mid-section.

DESCRIPTION OF THE DRAWINGS

FIG. 1(a) is a schematic side section view showing a prior art PSV;

FIG. 1(b) is a schematic side section view showing the TORV of the present invention;

FIG. 2 is a schematic, partly sectional, side view of the TORV, with arrows indicating the current upwelling centrally and circulating downwardly in the outer reaches of the vessel chamber;

FIG. 3 is a schematic, partly sectional, side view of the eductor/aerator assembly and plenum chamber positioned in the TORV, with the air bubbles, sand grains, froth and current suitably identified;

FIG. 4 is a schematic showing the TORV incorporated into a hot water process plant; and FIG. 5 is a sectional side view of a single eductor/aerator assembly.

DESCRIPTION OF THE PREFERRED EMBODIMENT

The tailings oil recovery vessel (TORV) 1 has the general configuration of a deep cone thickener. It comprises a generally cylindrical upper section 2, a shallow angle (60°) intermediate cone section 3, a steeper angle (68°) lower cone section 4, and a cylindrical base section 5.

A feed assembly 6 is centrally mounted on the TORV 1 at its upper end. The feed stream to be processed is delivered to the TORV via this assembly. More particularly, the assembly 6 comprises a vertically positioned, tubular feed well 7 supported by a cross-member 8 attached to the TORV sidewall. A vertical, tubular feed pipe 9 is mounted in the feed well 7 and extends donwardly through the floor of the latter. A feed conduit 10 connects tangentially with the side wall of the feed well 7 and communicates with the feed well chamber 11.

The feed to be processed, preferably comprising a slurry of sand, bitumen, water, and fines, most preferably being a mixture of PSV tailings and middlings, is introduced to the feed well 7 through the conduit 10. The slurry rises in the well chamber 11 and overflows into the pipe 9, from whence it discharges downwardly into the TORV.

A conical distributor baffle 12 is positioned directly below the outlet of the feed pipe 9 and extends transversely thereacross. The baffle 12 is suspended in spaced relation to the feed pipe outlet by members 13 secured to the cross-member 8.

The distributor baffle 12 functions to deflect the slurry, discharging fromthe feed pipe 9, outwardly into a generally horizontal plane, so that it spreads radially along the surface 13a of the body 14 of middlings already present in the vessel chamber 15.

A plenum assembly 16, forming a plenum chamber 17, is attached to the underside of the distribution baffle 12. The plenum assembly 16 is centrally positioned in the body 14 of middlings and is submerged therein. The upper and lower walls 18, 19 of the plenum assembly 16 combine to form a peripheral, slot-like outlet 20 extending around the upper edge of the plenum chamber 17.

A plurality of open-ended eductor tubes 21 extend outwardly from the plenum assembly lower wall 19 and interconnect the plenum chamber 16 with the body 14 of the middlings.

As shown in FIG. 5, a tubular nozzle member 22 is mounted in coaxial, outwardly spaced alignment on each such eductor tube 21 by a bracket 23.

Each nozzle member 2 is circumscribed by a tubular sparger 23a mounted thereon. This sparger 23a is connected by a line 24 with a source (not shown) of pressurized air. At its end remote from the plenum assembly, the nozzle member 22 is connected by a line 25 with a pump 26, which supplies recirculated middlings under pressure from a storage tank 27. At its end adjacent the eductor tube 21, the nozzle member 22 forms an orifice 28 for the discharge of a jet of aerated middlings.

The eductor tube 21, nozzle member 22, and sparger 23a together combine to form an eductor/aerator assembly 61.

Each of these eductor/aerator assemblies 61 is operative to direct or inject a jet of copiously aerated, recirculated middlings into the inlet 29 of the eductor tube 21. These injected streams or jets function to induce additional middlings, from the main body 14, to flow into the plenum chamber 17 through the tubes 21. The aerated middlings are discharged outwardly, slightly upwardly, and generally radially from the plenum chamber 17 through the slot-like outlet 20.

As a result of such middlings injection, a generally circular pattern is established in the TORV, as indicated by the arrows in the drawing. This current pattern includes an upwelling leg through the plenum chamber, an outwardly, radially moving leg contiguous to the outwardly radiating, newly introduced slurry, and a downwardly descending leg in the outer reaches of the body 14 of middlings. The incoming slurry is spread as a thin layer on top of the fast-moving layer of aerated middlings discharged from the plenum assembly. As the two layers contact and mix, the fine air bubbles have an opportunity to contact the bitumen in the newly arrived slurry and recirculated middlings and form froth.

The formed froth accumulates as a layer 29a at the periphery of the middlings surface 13a.

A vertical, circular weir 30 is suspended in the vessel chamber 15 in spaced relation to the side wall 37 of the cylindrical upper section 2. The weir 30 is positioned so that its upper edge is just below the anticipated upper surface of the froth layer 29a. The weir 30 is submerged, but functions to retain most of the layer 29a of froth. A second vertical, circular weir 31 is positioned outwardly from the weir 30 in spaced relation. This second weir 31 extends downwardly a short distance below the top edge of the first weir 30. Between them, the weirs 30, 31 form a zone 32 referred to as the froth wash zone. A circular pipe 33 is mounted on the TORV immediately above the froth wash zone 32. The pipe 33 has spaced spray nozzles 34 extending downwardly from it and is connected to a source (not shown) of pressurized, clean water. The pipe 33 is thus operative to deliver a spray of water down onto the froth which has overflowed the inner weir 30. This water partly deaerates the froth and washes away some of the solids attached to it.

The TORV froth thus accumulates as a layer 29a, overflows into the zone 32, and is washed by the water spray.

The cleaned, partly deaerated froth can leave the wash zone 32 by moving beneath the outer weir 31.

A froth launder 35, having a discharge pipe 36, is attached to the TORV sidewall on the outer side of the outer weir 31. The cleaned, partly deaerated froth overflows into this launder 35 and is recovered.

The side wall 37 of the vessel's cylindrical upper section 2 has a vertically movable weir 38 attached thereto at its upper end. This weir 38 can be adjusted up or down to control the level of the upper surface 13a of the body 14 of middlings. A middlings launder 39 is secured to the side wall 37, whereby excess middlings may overflow the weir 38 and drop thereinto. The middlings launder 39 is connected by a line 40 with the storage tank 27.

Means are provided in the lower end of the TORV 1 for withdrawing sand collected there. Such means comprise a suction spider 41, having a plurality of inlets 42, and a suction conduit 43 connected with the spider and extending out of the vessel. The conduit 43 is connected with a pump for applying suction. Flush nozzles 44, connected with a source of pressurized water, are provided at the spider inlets 42, to direct jets of water at the inlets to unplug them on start-up.

The sand grains contained in the newly delivered slurry settle downwardly in the chamber 15 and collect in the form of a relatively high density ($>65\%$ by weight) sand bed 45. The density and height of this sand bed 45 are adjusted to desired levels by varying the rate of tailings withdrawal.

The TORV is shown in FIG. 4 in the context of a flow circuit. The general operation of this circuit will now be described, with particular detail given as to the process mechanisms which take place within the TORV.

Conditioned tar sand slurry from a drum or tumbler 50 is discharged into a flood box 51, wherein it is diluted with flood water. The dilute slurry is pumped through line 52 into a PSV 53. Primary froth from the PSV is produced through line 54. The PSV underflow tailings are pumped through feed conduit 10 to the TORV 1. The PSV middlings are pumped through line 55 to connect with feed conduit 10, wherein they combine with the PSV primary tailings to form the TORV feed.

The froth produced by the TORV is removed through line 36. Overflow middlings are produced through line 40 into storage tank 27. Middlings are withdrawn from the tank 27 and pumped through line 25 to nozzle members 22. The tailings stream produced by the TORV is removed through line 43 for disposal in a pond or the like.

All of the excess middlings in the storage tank 27 are pumped through line 56 to the secondary recovery flotation cells 57. Secondary froth from the flotation cells 57 is produced through line 58 and secondary tailings is produced through line 59. Some of the secondary tailings is diverted from line 59 through feed line 60, to supply fluidizing fluid to the spider nozzles 44.

In the TORV, the incoming feed is delivered downwardly onto the distributor baffle 12, which deflects and distributes the slurry outwardly and generally horizontally as a relatively thin sheet, on top of the fast moving, underlying, upwelling layer of aerated middlings. At the same time, aerated middlings are being discharged from the circular slot-like outlet 20 of the plenum assembly 16 in a radial, outward, and gradually upwelling flow. As the outwardly-moving and slightly upwelling flow of aerated middlings comes into contact with the superimposed layer of bitumen-laden feed, the bubbles of air released from the middlings must pass upwardly through the layer of feed before escaping to atmosphere and all feed must pass downwardly through the layer of aerated middlings before entering the main body 14 of middlings. As the two streams contact and mix, both move outwardly towards the periphery of the TORV. As the outward flow velocity slackens, the aerated globules of bitumen remain on the surface in the form of light, loose froth, whereas the sand particles settle downwardly. The water and suspended fine solids, as well as suspended fine bitumen globules which did not form froth, join the body 14 of middlings. A portion of those middlings is induced to move through the plenum assembly 16 and the excess overflows the rim of the vessel over the adjustable weir 38 into the middlings launder 39 and is collected in the middlings storage tank 27. The sand particles settle downwardly in the cone sections 3,4 and concentrate into a dense bed 45 of sand, having a solids content typically in the order of at least 65% by weight. The bottom portion of this bed 45 is continually removed by the suction means. If necessary the density of the widthdrawn underflow stream can be reduced by injection of water through the flush nozzles 44.

EXAMPLE I

This example gives the results obtained from the operation of a 3m diameter field pilot vessel.

| | 3m TORV | | | |
|---|---|---|---|---|
| Run | 1 | 2 | 3 | 4 |
| TORV FEED | | | | |
| PSV tails | | | | |
| rate (kg/s) | 50.21 | 46.5 | 46.1 | 48.2 |
| % bitumen | 0.44 | 0.37 | 0.41 | 0.38 |
| % solids | 65.47 | 50.1 | 58.2 | 62.6 |
| PSV middlings | | | | |
| rate (kg/s) | 6.72 | 6.1 | — | — |
| % bitumen | 1.11 | 1.72 | — | — |
| % solids | 19.85 | 24.0 | — | — |
| CONDITION | | | | |
| Middlings recycle | | | | |
| Rate (L/s) | 7.07 | 7.9 | 8.1 | 10.0 |
| Air addition | | | | |
| Rate (L/s) | 54.30 | 70.8 | 70.8 | 37.8 |
| TORV PRODUCTS | | | | |
| TORV Froth before cleaning | | | | |
| Rate (kg/s) | 0.23 | 0.71 | 0.4 | 0.37 |
| % bitumen | 27.02 | 11.9 | 11.6 | 24.0 |
| % solids | 20.4 | 19.9 | 20.3 | 18.9 |
| TORV Middlings to further flot″ | | | | |
| Rate (kg/s) | 11.87 | 11.98 | 9.06 | 8.87 |
| % bitumen | 1.05 | 1.00 | 1.12 | 0.27 |
| % solids | 40.03 | 20.41 | 30.6 | 49.28 |
| TORV Tails | | | | |
| Rate (kg/s) | 44.83 | 40.77 | 36.62 | 38.95 |
| % bitumen | 0.24 | 0.21 | 0.11 | 0.18 |
| % solids | 65.6 | 68.26 | 65.49 | 66.1 |

When converted into commercial process rates, these results could represent a saving of 2 million barrels of bitumen per year.

EXAMPLE II

1m Diameter TORV

The 1m diameter TORV was an investigatory research-scale pilot vessel having a vertical draft tube and eductor and plenum assembly of the 3m vessel. The distribution of bitumen in four separate runs is presented. Both the hot water extraction process and the tailings oil recovery were performed in continuous units. For this reason, there is some variation in the streams which were fed to the TORV.

The data shows the different results obtained with the TORV, as one alters middlings recycle rate and air addition.

Also shown is the improvement obtained in TORV froth quality, which results from washing the froth. The table presents these results for a low bitumen and a higher bitumen TORV froth.

| | Middlings recycle rate (kg/h) | Air addition (scfm) |
|---|---|---|
| Run a | 0 | 0 |
| Run b | 400 | 0 |
| Run c | 0 | 40 |
| Run d | 400 | 40 |

| Run | a | b | c | d |
|---|---|---|---|---|
| Feed (i.e., PSV tails + PSV middlings) | | | | |
| Rate (kg/h) | 4220 | 4243 | 4242 | 4229 |
| Bitumen (wt. %) | 1.45 | 1.07 | 2.14 | 1.16 |
| Froth (before settling in cleaner) | | | | |
| Rate (kg/h) | 117 | 330 | 427 | 230 |
| Bitumen (wt. %) | 25.75 | 5.45 | 10.32 | 14.02 |
| Recovery (expressed as % of TORV feed bitumen) | 49.24 | 39.61 | 48.54 | 65.73 |
| Sand bed density (kg/L) | 1.69 | 1.65 | 1.71 | 1.75 |
| Froth (after settling) | | | | |
| Rate (kg/h) | — | 30 | 72 | 80 |
| Bitumen (wt. %) | 49.99 | 52.51 | 54.39 | 39.5 |
| Middlings | | | | |
| Rate (kg/h) | 1151 | 794 | 1086 | 1129 |
| Bitumen (wt. %) | 3.97 | 1.37 | 2.45 | 0.68 |
| Tailings (after dilution) | | | | |
| Rate (kg/h) | 3690 | 3456 | 3052 | 3750 |
| Bitumen (wt. %) | 0.41 | 0.32 | 0.58 | 0.27 |
| Density (kg/L) | 1.52 | 1.60 | 1.63 | 1.52 |
| % Bitumen lost based on total bitumen entering TORV as feed | 21.4 | 22.1 | 17.5 | 14.2 |

Examples of improved froth quality as a result of froth washing

| | % Bitumen | | % Solids | | Ratio of solids/ bitumen | |
|---|---|---|---|---|---|---|
| | 1 | 2 | 1 | 2 | 1 | 2 |
| Raw froth from TORV | 25.3 | 32.16 | 31.58 | 19.36 | 1.25 | 0.60 |
| Froth after washing | 42.93 | 52.24 | 21.77 | 12.93 | 0.51 | 0.25 |

The embodiments of the invention in which an exclusive property or privilege is claimed are defined as follows:

1. A method for continuously recovering bitumen from a feed stream comprising water, sand, fines, and bitumen in a vessel having a conical lower end and which defines a processing chamber, comprising:

delivering said feed stream to be processed at the surface of the body of middlings already in the chamber;

substantially simultaneously contacting the newly added feed with a current of outwardly and generally horizontally moving aerated middlings;

whereby said newly added feed moves generally radially of the chamber in contact with the aerated middlings current, part of the bitumen contained in said newly added feed forms a froth layer at the surface of the body, bitumen-depleted feed forms a body of middlings in the chamber below the froth layer, and sand particles contained in said newly added feed settle downwardly;

concentrating the settling sand particles in the conical lower end of the vessel into the form of a dense solids bed, thereby separating the greatest part of the liquid phase from the solids phase;

recovering the greatest part of the froth from the vessel;

withdrawing an underflow tailings stream from the base of the vessel; and withdrawing a middlings stream from the vessel midsection.

2. The method as set forth in claim 1, comprising:
causing middlings in the chamber to circulate upwardly, centrally of the chamber, to generate an upwelling current; and
injecting air into said upwelling middlings to permeate them with air bubbles.

3. The method as set forth in claim 2 comprising:
removing some middlings from the chamber and pumping them back into the central portion of the chamber to induce a circulation of middlings which manifests itself as the upwelling central current.

4. The method as set forth in claim 1 comprising:
providing a plenum assembly centrally of the chamber, said assembly having one or more eductor/aerator assemblies communicating therewith;
removing some middlings from the chamber and pumping them through the eductor/aerator assemblies to induce a circulation which manifests itself as the upwelling central current; and
injecting air into said eductor/aerator assemblies to permeate the middlings, passing therethrough, with air bubbles.

5. The method as set forth in claim 2 comprising:
deflecting the feed stream outwardly into a generally horizontal plane as it is delivered at the surface of the body of middlings;
and directing the upwelling current outwardly into a generally horizontal plane as it reaches the surface of the body of middlings;
whereby said feed stream and upwelling current move outwardly adjacent said surface and mix.

6. The method as set forth in claim 4 comprising:
deflecting the feed stream outwardly into a generally horizontal plane as it is delivered at the surface of the body of middlings;
and directing the upwelling current outwardly into a generally horizontal plane as it reaches the surface of the body of middlings;
whereby said feed stream and upwelling current move outwardly adjacent said surface and mix.

7. The method as set forth in claim 1 wherein:
the sand particles are concentrated to form a bed having a density of at least 65% by weight.

8. The method as set forth in claim 3 wherein:
the sand particles are concentrated to form a bed having a density of at least 65% by weight.

9. The method as set forth in claim 4 wherein:
the sand particles are concentrated to form a bed having a density of at least 65% by weight.

10. The method as set forth in claim 1 comprising:
washing the froth with a spray of water at the periphery of the vessel before the froth is recovered.

11. The method as set forth in claim 3 comprising:
washing the froth with a spray of water at the periphery of the vessel before the froth is recovered.

12. The method as set forth in claim 7 comprising:
washing the froth with a spray of water at the periphery of the vessel before the froth is recovered.

13. The method as set forth in claim 1 comprising:
fluidizing the base of the sand bed with an aqueous stream, to produce a flowable stream of tailings which may be withdrawn.

14. The method as set forth in claim 3 comprising:
fluidizing the base of the sand bed with an aqueous stream, to produce a flowable stream of tailings which may be withdrawn.

15. The method as set forth in claim 4 comprising:
fluidizing the base of the sand bed with an aqueous stream, to produce a flowable stream of tailings which may be withdrawn.

16. The method as set forth in claim 5 comprising:
fluidizing the base of the sand bed with an aqueous stream, to produce a flowable stream of tailings which may be withdrawn.

17. The method as set forth in claim 7 comprising:
fluidizing the base of the sand bed with an aqueous stream, to produce a flowable stream of tailings which may be withdrawn.

18. The method as set forth in claim 1 wherein:
the feed stream comprises a mixture of hot water extraction process primary tailings and middlings.

19. The method as set forth in claim 2 wherein:
the feed stream comprises a mixture of hot water extraction process primary tailings and middlings.

20. The method as set forth in claim 3 wherein:
the feed stream comprises a mixture of hot water extraction process primary tailings and middlings.

21. The method as set forth in claim 4 wherein:
the feed stream comprises a mixture of hot water extraction process primary tailings and middlings.

22. The method as set forth in claim 5 wherein:
the feed stream comprises a mixture of hot water extraction process primary tailings and middlings.

23. The method as set forth in claim 6 wherein:
the feed stream comprises a mixture of hot water extraction process primary tailings and middlings.

* * * * *